United States Patent
Babayev

(10) Patent No.: US 12,486,808 B2
(45) Date of Patent: Dec. 2, 2025

(54) GASEOUS FUEL SUPPLY SYSTEM TO A CLEAN COMBUSTION ENGINE

(71) Applicant: Volvo Truck Corporation, Gothenburg (SE)

(72) Inventor: Rafig Babayev, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/965,226

(22) Filed: Dec. 2, 2024

(65) Prior Publication Data

US 2025/0198356 A1    Jun. 19, 2025

(30) Foreign Application Priority Data

Dec. 13, 2023   (EP) ..................................... 23216341

(51) Int. Cl.
   *F02D 19/02*   (2006.01)
(52) U.S. Cl.
   CPC .................................. *F02D 19/024* (2013.01)
(58) Field of Classification Search
   CPC ...................................................... F02D 19/024
   See application file for complete search history.

(56) References Cited

U.S. PATENT DOCUMENTS

| | | |
|---|---|---|
| 5,092,281 A | 3/1992 | Iwaki et al. |
| 5,868,122 A | 2/1999 | Gram et al. |
| 7,367,312 B1 | 5/2008 | Boyer et al. |
| 9,995,258 B2 * | 6/2018 | Takeuchi ............ F02M 37/0052 |
| 11,639,691 B2 | 5/2023 | Puran et al. |

(Continued)

FOREIGN PATENT DOCUMENTS

| | | |
|---|---|---|
| CN | 106915235 A | 7/2017 |
| CN | 114183276 A | 3/2022 |

(Continued)

OTHER PUBLICATIONS

Certification of Correction for U.S. Pat. No. 5,092,281, dated Mar. 3, 1992.

(Continued)

*Primary Examiner* — Kevin A Lathers
(74) *Attorney, Agent, or Firm* — Withrow & Terranova, PLLC

(57) ABSTRACT

A gaseous fuel supply system for a clean combustion engine configured to receive gaseous fuel at a changeable demanded injection pressure being above a predetermined minimum required injection pressure and below a predetermined maximum required injection pressure. The supply system comprises a control unit configured to control supply of pressurized gaseous fuel from a first gaseous fuel tank arrangement to the clean combustion engine using second supply line, and control a compressor such that the gaseous fuel in a buffer tank is pressurized to at least the current demanded injection pressure, in response the pressure of the gaseous fuel in the first gaseous fuel tank arrangement is below current demanded injection pressure or predetermined first threshold value; and to subsequently, in response to a sudden increase in the demanded injection pressure, control supply of pressurized gaseous fuel from second gaseous fuel tank arrangement to buffer tank using third supply line.

20 Claims, 3 Drawing Sheets

(56) References Cited

U.S. PATENT DOCUMENTS

| | | |
|---|---|---|
| 2009/0114367 A1 | 5/2009 | Handa |
| 2014/0116375 A1 | 5/2014 | Kim et al. |
| 2014/0209070 A1 | 7/2014 | Gleeson et al. |
| 2021/0131382 A1 | 5/2021 | Manfrida et al. |
| 2022/0260040 A1 | 8/2022 | Malischewski et al. |
| 2025/0297587 A1* | 9/2025 | Matsuda ............ F02M 21/0239 |

FOREIGN PATENT DOCUMENTS

| | | | |
|---|---|---|---|
| CN | 116344866 A | | 6/2023 |
| DE | 102010053498 A1 | | 6/2012 |
| DE | 102016220851 A1 | | 4/2018 |
| DE | 102018215847 A1 | * | 3/2020 ......... F02M 21/0218 |
| EP | 3168445 A1 | * | 5/2017 ......... F02D 19/0628 |
| EP | 3578793 B1 | | 12/2019 |
| EP | 3578794 A1 | | 12/2019 |
| EP | 3885640 A2 | | 9/2021 |
| EP | 3915820 A1 | | 12/2021 |
| EP | 3885640 A3 | | 1/2022 |
| EP | 4245975 A1 | | 9/2023 |
| JP | 2017166424 A | | 9/2017 |
| JP | 2020094526 A | | 6/2020 |
| KR | 20200042278 A | | 4/2020 |
| KR | 102213227 B1 | | 2/2021 |
| WO | 2016115603 A1 | | 7/2016 |
| WO | 2022266769 A1 | | 12/2022 |

OTHER PUBLICATIONS

Extended European Search Report for European Patent Application No. 23216341.0, mailed May 21, 2024, 5 pages.
Extended European Search Report for European Patent Application No. 23216339.4, mailed May 21, 2024, 7 pages.
Extended European Search Report for European Patent Application No. 23216338.6, mailed May 2, 2024, 6 pages.
Extended European Search Report for European Patent Application No. 23216343.6, mailed May 21, 2024, 7 pages.

* cited by examiner

GASEOUS FUEL SUPPLY SYSTEM TO A CLEAN COMBUSTION ENGINE

PRIORITY APPLICATIONS

The present application claims priority to European Patent Application No. 23216341.0, filed on Dec. 13, 2023, and entitled "GASEOUS FUEL SUPPLY SYSTEM TO A CLEAN COMBUSTION ENGINE," which is incorporated herein by reference in its entirety.

TECHNICAL FIELD

The disclosure relates generally to gaseous fuel supply systems to a combustion engine. In particular aspects, the disclosure relates to gaseous fuel supply system for a clean combustion engine of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

Clean combustion engines typically require an efficient and reliable fuel supply, and a pressure and temperature regulation of the supplied gaseous fuel. However, the systems today may not provide optimal pressure regulation of the supplied gaseous fuel, leading to inefficiencies in fuel consumption and potential damage to the engine components. There is thus a need in the industry for an improved system.

SUMMARY

According to a first aspect of the disclosure, gaseous fuel supply system for a clean combustion engine configured to receive gaseous fuel at a changeable demanded injection pressure being above a predetermined minimum required injection pressure and below a predetermined maximum required injection pressure, is provided. The supply system comprises: a first gaseous fuel tank arrangement comprising at least a first gaseous fuel tank, and a second gaseous fuel tank arrangement comprising at least a second gaseous fuel tank, the first and second gaseous fuel tank arrangements storing pressurized gaseous fuel; a first supply line arranged to supply pressurized gaseous fuel from the first gaseous fuel tank arrangement to the clean combustion engine; a second supply line arranged to supply pressurized gaseous fuel from the first gaseous fuel tank arrangement to the clean combustion engine, the second supply line comprising a compressor and a gaseous fuel buffer tank arranged downstream of the compressor, at least the compressor being arranged to bypass the first supply line; a third supply line arranged to supply pressurized gaseous fuel from the second gaseous fuel tank arrangement to the buffer tank, the third supply line being different to the first and second supply lines, and a control unit configured to: control supply of pressurized gaseous fuel from the first gaseous fuel tank arrangement to the clean combustion engine using the first supply line in response to that the pressure of the gaseous fuel in the first gaseous fuel tank arrangement is above the predetermined maximum required injection pressure; and control supply of pressurized gaseous fuel from the first gaseous fuel tank arrangement to the clean combustion engine using the second supply line, and control the compressor such that the gaseous fuel in the buffer tank is pressurized to at least the current demanded injection pressure, in response to that the pressure of the gaseous fuel in the first gaseous fuel tank arrangement is below the current demanded injection pressure or a predetermined first threshold value; and subsequently, in response to a sudden increase in the demanded injection pressure, control supply of pressurized gaseous fuel from the second gaseous fuel tank arrangement to the buffer tank using the third supply line. The first aspect of the disclosure may seek to solve problems with undesired delay to reach the demanded injection pressure of the clean combustion engine when supplying pressurized gaseous fuel to the clean combustion engine from the buffer tank. A technical benefit may include an improved operation of the clean combustion engine, as the time for reaching the demanded injection pressure of the clean combustion engine subsequent to a sudden increase in the demanded injection pressure, when supplying pressurized gaseous fuel to the clean combustion engine from the buffer tank, is reduced. By providing at least two separate pathways for the pressurized gaseous fuel to reach the buffer tank (i.e. via the second supply line via the compressor, and third supply line), wherein the two separate pathways supply pressurized gaseous fuel from different fuel tank arrangements, the pressure of the gaseous fuel in the buffer tank can be better controlled, or at least more timely controlled. That is, as the third supply line is different to the second supply line and thus bypasses at least the compressor in the second supply line, the buffer tank may be fed with pressurized gaseous fuel from the second gaseous fuel tank arrangement, and thereby the pressure in the buffer tank can be controlled at least temporarily independently of the compressor. As increasing the pressure of the pressurized gaseous fuel by the compressor in the second supply line is associated with a time lag, the demanded injection pressure of the clean combustion engine subsequent to a sudden increase in the demanded injection pressure may be reached in a shorter time when supplying pressurized gaseous fuel from the second gaseous fuel tank arrangement and the third supply line as compared to using the compressor for increasing the pressure of the pressurized gaseous fuel in the buffer tank. The two separate pathways may e.g. be achieved by using different piping, such as non-overlapping piping, for the second supply line up to the buffer tank, and the third supply line.

Stated differently, the control unit may be configured to control supply of pressurized gaseous fuel from the second gaseous fuel tank arrangement to the buffer tank using the third supply line in response to a sudden increase in the demanded injection pressure from a first demanded injection pressure to a second demanded injection pressure. Thus, the second demanded injection pressure is higher than, and subsequent to, the first demanded injection pressure. That is, by using the third supply line, the time for the buffer tank to reach the second, or increased, demanded injection pressure is reduced. Typically, the control unit is configured to determine that the pressure of the gaseous fuel in the second gaseous fuel tank arrangement is above the predetermined maximum required injection pressure, or at least above the second demanded injection pressure by at least a predetermined value, prior to controlling the supply of pressurized gaseous fuel from the second gaseous fuel tank arrangement to the buffer tank using the third supply line. Hereby, it is ensured that the second gaseous fuel tank arrangement can be used to increase the pressure of the gaseous fuel in the buffer tank to the second demanded injection pressure.

Optionally in some examples, including in at least one preferred example, the predetermined first threshold value includes the expected pressure losses in the first supply line, i.e. between the first gaseous fuel tank arrangement and the clean combustion engine (or between the first gaseous fuel tank arrangement and an engine injection pressure regulator upstream of a fuel rail to the clean combustion engine). Thus, the predetermined first threshold value may be the sum of the current demanded injection pressure and such expected pressure losses.

Optionally in some examples, including in at least one preferred example, the sudden increase in the demanded injection pressure is defined as a minimum predetermined pressure difference over a predetermined time interval. The sudden increase may correspond to a minimum pressure rate, e.g. some value between 0.5 bar/s and 15 bar/s, such as e.g. a value between 1 bar/s and 10 bar/s or a value between 5 bar/s and 10 bar/s. The minimum predetermined pressure difference may be 1 bar and the predetermined time interval may be 5 s or 10 s. Alternatively, minimum predetermined pressure difference may correspond to a 5% or 10% increase of the pressure over the predetermined time interval. For example, if the pressurized gaseous fuel in the buffer tank is at 250 bar and the demanded injection pressure is suddenly increased from 240 bar to 290 bar (e.g. over a time period of 5 s), the control unit controls the supply of pressurized gaseous fuel via the third supply line in order to quickly increase the pressure in the buffer tank to be at least 290 bar, or at least a predefined value (e.g. 5 or 10 bar) above 290 bar to accommodate for any pressure losses between the buffer tank and the clean combustion engine (or between the buffer tank and an engine injection pressure regulator upstream of a fuel rail to the clean combustion engine).

It should also be noted that the sudden increase in demanded injection pressure need not to be identified as a minimum predetermined pressure difference over a predetermined time interval, but instead of another parameter correlating to such sudden increase in demanded injection pressure, e.g. a sudden increase in fuel flow rate to the clean combustion engine or a sudden increase of engine torque, over the predetermined time interval. That is, the control unit may be configured to identify a sudden increase in fuel flow rate or engine torque which corresponds to the above defined sudden increase in demanded injection pressure, and in response to such identification, control supply of pressurized gaseous fuel from the second gaseous fuel tank arrangement to the buffer tank using the third supply line. Such sudden increase in the fuel flow rate may be defined by a minimum fuel flow rate increase of e.g. 0.1 $g/s^2$, or a minimum predetermined flow rate difference of e.g. 0.1 g/s during the previously mentioned predetermined time interval (e.g. 5 s or 10 s). A sudden increase in engine torque may be defined by a minimum torque increase of e.g. 50 Nm over the previously mentioned predetermined time interval (e.g. 5 s or 10 s), or an increase of power of e.g. 10 KW over the previously mentioned predetermined time interval (e.g. 5 s or 10 s).

Optionally in some examples, including in at least one preferred example, the first supply line and the third supply line do not overlap with each other. A technical benefit May independent pathways for supplying pressurized gaseous fuel to the clean combustion engine bypassing the compressor, and supplying pressurized gaseous fuel to the buffer tank. That is, the pressure of the gaseous fuel in the buffer tank may be at least temporarily controlled independently of the first gaseous fuel tank arrangement. Stated differently, the first supply line and the third supply line are comprised in different piping, i.e. do not share a common piping or gaseous fuel transportation line, and/or are physically separate from each other, such as fully or completely separated from each other. As previously stated, the first and second supply lines are different to the third supply line. Thus, correspondingly, the third supply line is comprised in different piping as compared to the first and second supply lines, i.e. they do not share a common piping or gaseous fuel transportation line, and/or are physically separate from each other, such as fully or completely separated from each other.

Optionally in some examples, including in at least one preferred example, the control unit is configured to control supply of pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold value, and below the predetermined maximum required injection pressure. A technical benefit may include efficient utilization of the pressurized gaseous fuel in the first gaseous fuel tank arrangement. That is, the compressor and/or pressurized gaseous fuel from the third supply line need not to be utilized, as the pressurized gaseous fuel from the first gaseous fuel tank arrangement is sufficient to meet the current demanded injection pressure. The predetermined second threshold value is typically including the expected pressure losses in the first supply line, i.e. between the first gaseous fuel tank arrangement and the clean combustion engine (or between the first gaseous fuel tank arrangement and the engine injection pressure regulator upstream or on of the fuel rail). Thus, the predetermined second threshold value may be the sum of the current demanded injection pressure and such expected pressure losses.

Optionally in some examples, including in at least one preferred example, the control unit is configured to control the compressor such that the gaseous fuel in the buffer tank is pressurized to the current demanded injection pressure, or at most a pre-defined pressure above the current demanded injection pressure, in response to that the pressure of the gaseous fuel in the first gaseous fuel tank arrangement is below the current demanded injection pressure or the predetermined first threshold value. A technical benefit may include energy efficient utilization of the compressor. The pre-defined pressure above the current demanded injection pressure may at least correspond to the expected pressure losses from the buffer tank to the clean combustion engine (or to the engine injection pressure regulator upstream of or on the fuel rail). Moreover, in order to not frequently turning on and off the compressor, the pre-defined pressure above the current demanded injection pressure may be set to accommodate a buffer margin, e.g. 5 bar, in addition to the expected pressure losses.

Optionally in some examples, including in at least one preferred example, the gaseous fuel supply system further comprises: a fourth supply line arranged to supply pressurized gaseous fuel from the second gaseous fuel tank arrangement to the second supply line, wherein the control unit is configured to control supply of pressurized gaseous fuel from the first gaseous fuel tank arrangement and the second gaseous fuel tank arrangement to the clean combustion engine using the fourth and second supply lines, and to control the compressor such that the gaseous fuel in the second supply line is raised to the maximum required injection pressure, in response to that the pressure of the gaseous fuel in the second gaseous fuel tank arrangement is below the predetermined maximum required injection pressure. A technical benefit may include an efficient use of the gaseous fuel in the second gaseous fuel tank arrangement. For example, when the gaseous fuel in the first gaseous fuel tank arrangement has been depleted, the gaseous fuel in the second gaseous fuel tank arrangement may be supplied to the second supply line and the compressor for subsequent supply of pressurized gaseous fuel to the clean combustion engine.

Optionally in some examples, including in at least one preferred example, the fourth supply line is further arranged to supply pressurized gaseous fuel from the second gaseous fuel tank arrangement to the first supply line. A technical benefit may include an efficient use of the gaseous fuel in the second gaseous fuel tank arrangement. For example, when the gaseous fuel in the first gaseous fuel tank arrangement has been depleted, the gaseous fuel in the second gaseous fuel tank arrangement may be supplied to the first supply line for subsequent supply of pressurized gaseous fuel to the clean combustion engine.

Optionally in some examples, including in at least one preferred example, the first gaseous fuel tank arrangement comprises a plurality of first gaseous fuel tanks, and/or the second gaseous fuel tank arrangement comprises a plurality of second gaseous fuel tanks. A technical benefit may include increased flexibility of the first gaseous fuel tank arrangement and/or the second gaseous fuel tank arrangement. The pressure of the gaseous fuel in the first gaseous fuel tank arrangement may e.g. correspond to the mean pressure of the plurality of first gaseous fuel tanks in the first gaseous fuel tank arrangement (e.g. in case the plurality of the first gaseous fuel tanks are used simultaneously), or of the pressure in the currently used first gaseous fuel tank (e.g. in case the plurality of the first gaseous fuel tanks are used sequentially). Correspondingly, the pressure of the gaseous fuel in the second gaseous fuel tank arrangement may e.g. correspond to the mean pressure of the plurality of second gaseous fuel tanks in the second gaseous fuel tank arrangement (e.g. in case the plurality of the second gaseous fuel tanks are used simultaneously), or of the pressure in the currently used second gaseous fuel tank (e.g. in case the plurality of the second gaseous fuel tanks are used sequentially).

Optionally in some examples, including in at least one preferred example, the gaseous fuel supply system further comprises a plurality of valves arranged in at least the first, second and third supply lines, wherein the control unit is configured to control the valves to control the flow of pressurized gaseous fuel in the first, second and third supply lines. A technical benefit may include efficient control of supply of pressurized gaseous fuel in the first, second and third supply lines. Typically, the gaseous fuel supply system further comprises a valve arranged in the fourth supply line, wherein the control unit is configured to control the valve to control the flow of pressurized gaseous fuel in the fourth supply line.

Optionally in some examples, including in at least one preferred example, the first and second supply lines at least partly overlap. A technical benefit may include efficient utilization of piping in the gaseous fuel supply system. Thus, the first and second supply lines may at least partly share a common piping.

Optionally in some examples, including in at least one preferred example, the first, second and third supply lines are comprised in piping of the gaseous fuel supply system. A technical benefit may include efficient transportation of the pressurized gaseous fuel in the first, second and third supply lines. As previously mentioned, the piping of the third supply line is different to the piping of the first and second supply lines, but may be fluidly connected via the fourth supply line.

Optionally in some examples, including in at least one preferred example, the buffer tank is configured to supply pressurized gaseous fuel to the clean combustion engine via the second supply line. A technical benefit may include that pressurized gaseous fuel can be supplied to the clean combustion engine by the first supply line without passing the compressor and the buffer tank. That is, both the compressor and the buffer tank may be arranged to bypass the first supply line.

Optionally in some examples, including in at least one preferred example, the gaseous fuel supply system further comprises a heat exchanger arranged upstream or downstream of the compressor. A technical benefit may include an efficient way to control the temperature of the pressurized gaseous fuel. For example, the heat exchanger is arranged in between the compressor and the buffer tank, or downstream of the buffer tank. Moreover, more than one heat exchanger may be comprised in the gaseous fuel supply system, e.g. a first heat exchanger arranged upstream of the compressor, and a second heat exchanger arranged between the compressor and the buffer tank. Hereby, the temperature of the pressurized gaseous fuel can be controlled in an improved manner.

Optionally in some examples, including in at least one preferred example, the control unit is configured to, in response to that the pressure of the gaseous fuel in the second gaseous fuel tank arrangement is below the predetermined maximum required injection pressure but above the pressure of the gaseous fuel in the buffer tank, control supply of pressurized gaseous fuel from the second gaseous fuel tank arrangement to the buffer tank. A technical benefit may include efficient use of the gaseous fuel from the second gaseous fuel tank arrangement. Thus, the gaseous fuel from the second gaseous fuel tank arrangement may be used to reduce the time for the buffer tank to reach the increased demanded injection pressure even though the pressure of the gaseous fuel in the second gaseous fuel tank arrangement is below the predetermined maximum required injection pressure. For example, the control unit may be configured to control supply of pressurized gaseous fuel from the second gaseous fuel tank arrangement to the buffer tank in response to that the pressure of the gaseous fuel in the second gaseous fuel tank arrangement is within a predefined range extending somewhere between pressure of the gaseous fuel in the buffer tank and the predetermined maximum required injection pressure.

Optionally in some examples, including in at least one preferred example, the pressurized gaseous fuel is pressurized hydrogen. A technical benefit may include utilization of a fuel having a high energy density (approximately 120 MJ/kg). Moreover, by using hydrogen as the fuel for combustion in the clean combustion engine, CO2, unburned hydrocarbons (CO) and other carbon-containing emissions can be kept low, or even be avoided.

Optionally in some examples, including in at least one preferred example, the first and second gaseous fuel tanks of the first and second gaseous fuel tank arrangements are arranged to store the pressurized gaseous fuel at 700 bar or 800 bar. For example, the first and second gaseous fuel tanks are arranged to keep the pressurized gaseous fuel at a maximum pressure of between 700 bar and 800 bar. For example, the first and second gaseous fuel tanks are arranged to store the pressurized gaseous fuel between 70 bar and 700 bar or 800 bar.

Optionally in some examples, including in at least one preferred example, the fuel stored in the first and gaseous fuel tank arrangements is mainly gaseous. For example, at least 70%, or at least 80%, or at least 90%, or at least 95% (based on volume) of the fuel in the first and second gaseous fuel tanks is gaseous. Thus, the first and second gaseous fuel tanks are arranged to store the fuel as pressurized gaseous fuel such that at least 70%, or at least 80%, or at least 90%, or at least 95% (based on volume) of the fuel in the first and second gaseous fuel tanks is gaseous.

Optionally in some examples, including in at least one preferred example, the clean combustion engine is a hydrogen combustion engine, such as a hydrogen high pressure direct injection engine, wherein the gaseous fuel supply system is arranged to supply pressurized gaseous fuel to such hydrogen combustion engine.

According to a second aspect of the disclosure, a vehicle comprising the gaseous fuel supply system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure.

Optionally in some examples, including in at least one preferred example, the vehicle further comprises the clean combustion engine being a hydrogen combustion engine or a hydrogen high pressure direct injection engine. For example, the minimum required injection pressure of the hydrogen high pressure direct injection engine is at least 80 bar. The clean combustion engine is configured to receive the pressurized gaseous fuel from the first and second supply lines for combustion inside the engine. For example, the gaseous fuel supply system may comprise a fuel rail upstream of a fuel injector of the clean combustion engine, wherein the fuel rail is arranged to supply pressurized gaseous fuel by the first and second supply lines to the fuel injector(s).

The clean combustion engine is configured to receive gaseous fuel at a changeable demanded injection pressure being above a predetermined minimum required injection pressure and below a predetermined maximum required injection pressure. The control unit may e.g. be configured to control the pressure of the gaseous fuel supplied to the fuel rail, e.g. by means of an engine injection pressure regulator arranged upstream of or on the fuel rail.

Optionally in some examples, including in at least one preferred example, the minimum required injection pressure of the clean combustion engine is at least 80 bar.

According to third aspect of the disclosure, an engine system is provided. The engine system comprises the gaseous fuel supply system of the first aspect of the disclosure, and a clean combustion engine. The clean combustion engine may typically correspond to that already described with reference to the first aspect of the disclosure or the second aspect of the disclosure. The third aspect of the disclosure may seek to solve the same problem as described for the first and second aspects of the disclosure. Thus, effects and features of the third aspect of the disclosure are largely analogous to those described above in connection with the first and second aspects of the disclosure.

According to a fourth aspect of the disclosure, a method for controlling a gaseous fuel supply system for a clean combustion engine being configured to receive gaseous fuel at a changeable demanded injection pressure being above a predetermined minimum required injection pressure and below a predetermined maximum required injection pressure, is provided. The method comprises: supplying pressurized gaseous fuel from a first gaseous fuel tank arrangement comprising at least a first gaseous fuel tank to the clean combustion engine using a first supply line in response to that the pressure of the gaseous fuel in the first gaseous fuel tank arrangement is above the predetermined maximum required injection pressure; supplying pressurized gaseous fuel from the first gaseous fuel tank arrangement to the clean combustion engine using a second supply line, the second supply line comprising a compressor and a gaseous fuel buffer tank arranged downstream of the compressor, at least the compressor being arranged to bypass the first supply line, and pressurizing the gaseous fuel, by the compressor, such that the pressurized gaseous fuel in the buffer tank at least reaches the current demanded injection pressure, in response to that the pressure of the gaseous fuel in the first gaseous fuel tank arrangement is below the current demanded injection pressure or a predetermined first threshold value; and subsequently supplying, in response to a sudden increase in the demanded injection pressure, pressurized gaseous fuel from the second gaseous fuel tank arrangement to the buffer tank using a third supply line. The fourth aspect of the disclosure may seek to solve the same problem as described for the first to third aspects of the disclosure. Thus, effects and features of the fourth aspect of the disclosure are largely analogous to those described above in connection with the first to third aspects of the disclosure. That is, by supplying, in response to a sudden increase in the demanded injection pressure, pressurized gaseous fuel from the second gaseous fuel tank arrangement to the buffer tank using a third supply line, the time for the buffer tank to reach the increased demanded injection pressure is reduced.

Optionally in some examples, including in at least one preferred example, the method further comprises: supplying pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold vale, and below the predetermined maximum required injection pressure.

Optionally in some examples, including in at least one preferred example, further comprising: pressurizing the gaseous fuel, using the compressor, such that the gaseous fuel in the buffer tank reaches the current demanded injection pressure, or at most a pre-defined pressure above the current demanded injection pressure, in response to that the pressure of the gaseous fuel in the first gaseous fuel tank arrangement is below the current demanded injection pressure or a predetermined first threshold value.

Optionally in some examples, including in at least one preferred example, the method further comprises: supplying pressurized gaseous fuel from the second gaseous fuel tank arrangement to the clean combustion engine using the second supply line and a fourth supply line arranged to supply pressurized gaseous fuel from the second gaseous fuel tank arrangement to the second supply line, pressurizing the gaseous fuel, using the compressor, in the second supply line such that the pressurized gaseous fuel in the buffer tank at least reaches the maximum required injection pressure, in response to that the pressure of the gaseous fuel in the second gaseous fuel tank arrangement is below the predetermined maximum required injection pressure.

Applicable to the first to fourth aspects of the disclosure, the clean combustion engine may be configured to combust the gaseous fuel, e.g. hydrogen or a hydrogen-based fuel, producing water as by-product in the exhausts, wherein the gaseous fuel supply system is arranged to supply such gaseous fuel to the clean combustion engine. The clean combustion engine is typically configured to compress the gaseous fuel, e.g. hydrogen or a hydrogen-based fuel, together with air whereafter the fuel-air mixture is ignited (by a spark-plug or injection of another fuel, e.g. diesel). Alternatively, the clean combustion engine may be configured to compress only air, wherein the gaseous fuel is injected at the end of the compression stroke of the engine to either auto-ignite (by compression ignition) or be ignited by a spark-plug or injection of another fuel (e.g. diesel). The clean combustion engine may thus be an internal combustion engine.

It should be understood that the gaseous fuel of the gaseous fuel supply system may be hydrogen or a hydrogen-based fuel. As an alternative, the gaseous fuel of the gaseous fuel supply system is at least one of the following: natural gas, biogas, syngas, methane, propane and butane.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

The detailed description set forth below provides information and examples of the disclosed technology with sufficient detail to enable those skilled in the art to practice the disclosure.

The disclosed technology may solve the problem relating to undesired delay to reach the demanded injection pressure of the clean combustion engine when supplying pressurized gaseous fuel to the clean combustion engine from the buffer tank. The disclosed technology uses a second supply line and a third supply lines to supply pressurized gaseous fuel to a buffer tank, wherein the second supply line and third supply line are arranged to supply pressurized gaseous fuel from two separate gaseous fuel tank arrangements. Thus, at least two separate pathways for the pressurized gaseous fuel to reach the buffer tank (i.e. via the second and third supply lines) is provided, wherein the two separate pathways supply pressurized gaseous fuel from different fuel tank arrangements. A technical benefit may include an improved operation of the clean combustion engine, as the time for reaching the demanded injection pressure of the clean combustion engine subsequent to a sudden increase in the demanded injection pressure, when supplying pressurized gaseous fuel to the clean combustion engine from the buffer tank, is reduced. Hereby, an improved operation of the clean combustion engine may be provided.

Figure 1:
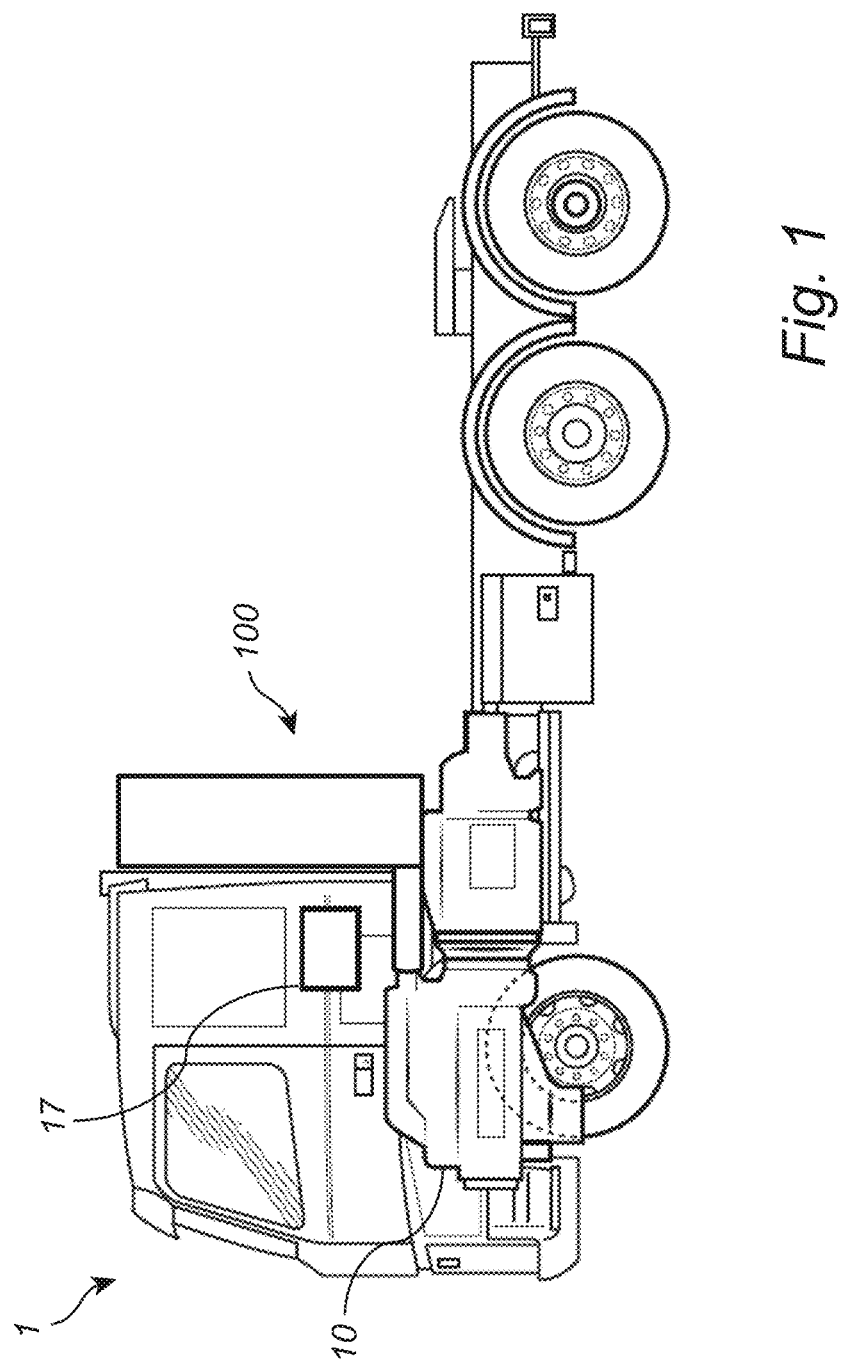
FIG. 1 is an exemplary, partly schematic, side view of vehicle comprising an internal combustion engine and a gaseous fuel supply system arranged to supply gaseous fuel to the internal combustion engine according to one example.

FIG. 1 shows a vehicle 1 in the form of an exemplary heavy duty truck. The vehicle 1 illustrated in FIG. 1 comprises an internal combustion engine 10 for propelling the vehicle 1, wherein the internal combustion engine 10 is a clean combustion engine. The clean combustion engine 10 is configured to combust a pressurized gaseous fuel producing water as by-product in the exhausts. The clean combustion engine 10 may e.g. be a hydrogen combustion engine, such as a hydrogen high pressure direct injection engine. However, the vehicle may be a hybrid, comprising at least one electric machine or electric traction machine powered by an energy storage system (not shown) to provide additional propulsion power to the vehicle 1. The clean combustion engine 10 is powered by a gaseous fuel (e.g. hydrogen) supplied to the clean combustion engine 10 by a gaseous fuel supply system 100.

The vehicle 1 comprises a control unit 17 configured to control at least some of the operation of the gaseous fuel supply system 100, such as e.g. the control of the gaseous fuel from a gaseous fuel tank to the clean combustion engine 10.

Figure 2:
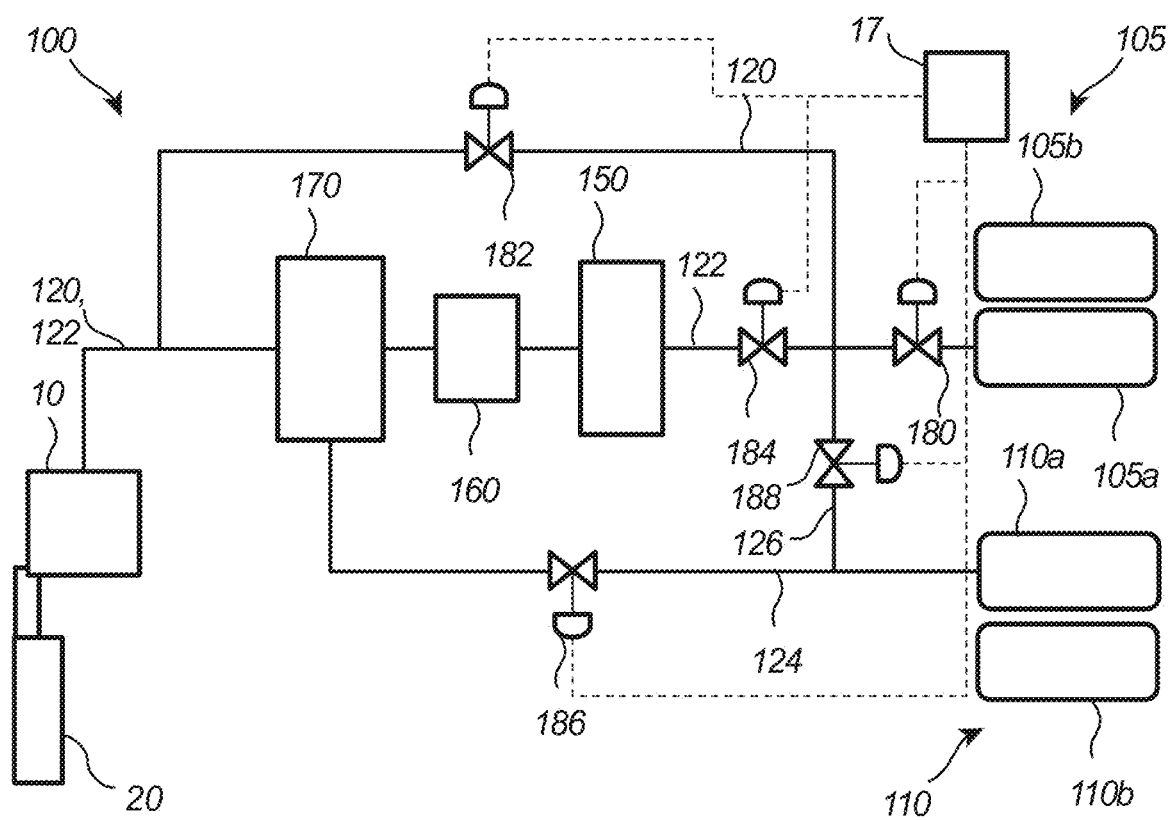
FIG. 2 is a schematic view of the gaseous fuel supply system of FIG. 1 according to one example.

In FIG. 2, the gaseous fuel supply system 100 of FIG. 1 is shown in more detail. The gaseous fuel supply system 100 comprises a first gaseous fuel tank arrangement 105 storing pressurized gaseous fuel, e.g. pressurized hydrogen, and a first supply line 120 arranged to supply pressurized gaseous fuel from the first gaseous fuel tank arrangement 105 to the clean combustion engine 10. In the example of FIG. 2, the first gaseous fuel tank arrangement 105 comprises a plurality of first gaseous fuel tanks 105a, 105b storing pressurized gaseous fuel. Any one, or all, of the plurality of first gaseous fuel tanks 105a, 105b may be fluidly coupled to a first controllable valve 180 arranged in the first supply line 120 and configured to control the flow of pressurized gaseous fuel in the first supply line 120. The flow of pressurized gaseous fuel in the first supply line 120 may additionally be controlled by a second controllable valve 182.

The gaseous fuel supply system 100 further comprises a second supply line 122 arranged to supply pressurized gaseous fuel from the first gaseous fuel tank arrangement 105 to the clean combustion engine 10. Thus, in addition to the first supply line 120, the second supply line 122 is arranged to supply pressurized gaseous fuel from the first gaseous fuel tank arrangement 105 to the clean combustion engine 10. The gaseous fuel supply system 100 further comprises a compressor 150 and a gaseous fuel buffer tank 170 arranged in the second supply line 122. The buffer tank 170 is arranged downstream of the compressor 150. In the example of FIG. 2, the compressor 150 and the buffer tank 170 are arranged to bypass the first supply line 120, and the buffer tank 170 is configured to supply pressurized gaseous fuel to the clean combustion engine 10 via the second supply line 120. As show in FIG. 2, the first supply line 120 and the second supply line 122 partly overlap, at least over the first controllable valve 180. Thus, the first controllable valve 180 is additionally configured to control the flow of pressurized gaseous fuel in the second supply line 122. The flow of pressurized gaseous fuel in the second supply line 122 may additionally be controlled by a third controllable valve 184.

As shown in FIG. 2, the gaseous fuel supply system 100 comprises a second gaseous fuel tank arrangement 110 storing pressurized gaseous fuel, e.g. pressurized hydrogen, and a third supply line 124 arranged to supply pressurized gaseous fuel from the second gaseous fuel tank arrangement 110 to the buffer tank 170. In the example of FIG. 2, the second gaseous fuel tank arrangement 110 comprises a plurality of second gaseous fuel tanks 110a, 110b storing pressurized gaseous fuel. Any one, or all, of the plurality of second gaseous fuel tanks 110a, 110b may be fluidly coupled to a fourth controllable valve 186 arranged in the third supply line 124 and configured to control the flow of pressurized gaseous fuel in the third supply line 124. The third supply line 124 is different to the first and second supply lines 120, 122 in the sense that the third supply line 124 do not overlap with the first and second supply lines 120, 122. Thus, the buffer tank 170 may be reached by pressurized gaseous fuel from at least two different pathways, a first being the second supply line 122 via the compressor 150, and the second being the third supply line 124. The first, second and third supply lines 120, 122, 124 are typically comprised in piping of the gaseous fuel supply system 100.

The control unit 17 may be configured to control the flow of the of pressurized gaseous fuel in the first, second and third supply lines 120, 122, 124 by controlling the first, second, third and fourth controllable valves 180, 182, 184, 186. That is, the control unit 17 is configured to control supply of pressurized gaseous fuel from the first gaseous fuel tank arrangement 105 to the clean combustion engine 10 using the first supply line 120 by opening the first and second controllable valves 180, 182, and closing the third controllable valve 184. Moreover, the control unit 17 is configured to control supply of pressurized gaseous fuel from the first gaseous fuel tank arrangement 105 to the clean combustion engine 10 using the second supply line 120 by opening the first and third controllable valves 180, 184, and closing the second controllable valve 182. Correspondingly, and independently of the flow of the of pressurized gaseous fuel in the first and second supply lines 120, 122, the control unit 17 is configured to control supply of pressurized gaseous fuel from the second gaseous fuel tank arrangement 110 to the buffer tank 170 using the third supply line 120 by opening the fourth controllable valve 186.

As also shown in FIG. 2, the gaseous fuel supply system 100 may comprise a fourth supply line 126 arranged to supply pressurized gaseous fuel from the second gaseous fuel tank arrangement 110 to first supply line 120 an/or to the second supply line 122, depending on the operation of the second and third controllable valves 182, 184. The flow of pressurized gaseous fuel in the fourth supply line 126 may be controlled by a fifth controllable valve 188. Thus, the control unit 17 may be configured to control the flow of the of pressurized gaseous fuel in the fourth supply line 126 by controlling the fifth controllable valve 188. If not mentioned otherwise, the fifth controllable valve 188 is closed.

The clean combustion engine 10 is configured to receive gaseous fuel at a changeable demanded injection pressure being above a predetermined minimum required injection pressure and below a predetermined maximum required injection pressure. The minimum required injection pressure of the clean combustion engine 10 may e.g. be at least 80 bar. The changeable demanded injection pressure may e.g. be controlled by an engine injection pressure regulator (not shown) arranged upstream of a fuel rail. Depending on the pressure of the gaseous fuel tanks of the first and second gaseous fuel tank arrangements 105, 110, the control unit 17 may operate the controllable valves 180, 182, 184, 186, 188, and the compressor 150, to control supply of pressurized gaseous fuel to the clean combustion engine 10 and the buffer tank 170. The control unit 17 may be configured to receive, or determine, the pressure of the gaseous fuel in the first and second gaseous fuel tanks of the first and second gaseous fuel tank arrangements 105, 110, e.g. by means of corresponding pressure sensors (not shown).

The control unit 17 is configured to control supply of pressurized gaseous fuel from the first gaseous fuel tank arrangement 105 to the clean combustion engine 10 using the first supply line 120 in response to that the pressure of the gaseous fuel in the first gaseous fuel tank arrangement 105 is above the predetermined maximum required injection pressure. This may e.g. be achieved by that the control unit 17 operates the controllable valves 180, 182, 184, 186, 188 such that the first and second controllable valves 180, 182 are open, and the third, fourth and fifth controllable valves 184, 186, 188 are closed.

Moreover, the control unit 17 is configured to control supply of pressurized gaseous fuel from the first gaseous fuel tank arrangement 105 to the clean combustion engine 10 using the second supply line 122, and control the compressor 150 such that the gaseous fuel in the buffer tank 170 is pressurized to at least the current demanded injection pressure, in response to that the pressure of the gaseous fuel in the first gaseous fuel tank arrangement 105 is below the current demanded injection pressure (or below a predetermined first threshold value taking at least the expected pressure losses in the first supply line into account). This may e.g. be achieved by that the control unit 17 operates the controllable valves 180, 182, 184, 186, 188 such that the first and third controllable valves 180, 184 are open, and the second, fourth and fifth controllable valves 182, 186, 188 are closed. Hereby, pressurized gaseous fuel from the first gaseous fuel tank arrangement 105 may be supplied to the clean combustion engine 10, as the gaseous fuel is pressurized to at least the current demanded injection pressure by the compressor 150 (typically pressurized to a value being the sum the current demanded injection pressure and the expected pressure losses from the compressor to the clean combustion engine 10 (or to the engine injection pressure regulator).

The control unit 17 is additionally configured to, during supply of pressurized gaseous fuel via the second supply line (i.e. the first and third controllable valves 180, 184 are open, and the second, fourth and fifth controllable valves 182, 186, 188 are closed), control supply of pressurized gaseous fuel from the second gaseous fuel tank arrangement 110 to the buffer tank 170 using the third supply line 124, in response to a sudden increase in the demanded injection pressure. This may be achieved by that the control unit 17 operates the fourth controllable valve 186 to be open (and at least the fifth controllable valve 188 to be closed). That is, as increasing the pressure of the pressurized gaseous fuel by the compressor 150 to the increased demanded injection pressure in the second supply line 122 is associated with a time lag, the increased demanded injection pressure (i.e. the demanded injection pressure subsequent to the sudden increase in the demanded injection pressure) may be reached in a shorter time when supplying pressurized gaseous fuel from the second gaseous fuel tank arrangement 110 and the third supply line 124 as compared to using the compressor 150 for increasing the pressure of the pressurized gaseous fuel in the buffer tank 170. For example, the control unit 17 may be configured to control the supply of pressurized gaseous fuel from the second gaseous fuel tank arrangement 110 to the buffer tank 170 via the third supply line 124 in response to that the pressure of the gaseous fuel in the second gaseous fuel tank arrangement 110 is at least above the pressure of the gaseous fuel in the buffer tank 170, such as e.g. above the predetermined maximum required injection pressure. However, the control unit 17 may alternatively be configured to control the supply of pressurized gaseous fuel from the second gaseous fuel tank arrangement 110 to the buffer tank 170 via the third supply line 124 in response to that the pressure of the gaseous fuel in the second gaseous fuel tank arrangement 110 is below the predetermined maximum required injection pressure but above the pressure of the gaseous fuel in the buffer tank 170.

The control unit 17 may be further configured to control supply of pressurized gaseous fuel from the first gaseous fuel tank arrangement 105 to the clean combustion engine 10 using the first supply line 120 in response to that the pressure of the gaseous fuel in the first gaseous fuel tank arrangement 105 is above the current demanded injection pressure (or a predetermined second threshold value taking at least the expected pressure losses in the first supply line into account), and below the predetermined maximum required injection pressure. This may e.g. be achieved by that the control unit 17 operates the controllable valves 180, 182, 184, 186, 188 such that the first and second controllable valves 180, 182 are open, and the third, fourth and fifth controllable valves 184, 186, 188 are closed. Hereby, the pressurized gaseous fuel in the first gaseous fuel tank arrangement 105 may be more fully utilized.

Moreover, the control unit 17 may be configured to control the compressor 150 such that the gaseous fuel in the buffer tank 170 is pressurized to the current demanded injection pressure, or at most a pre-defined pressure above the current demanded injection pressure, in response to that the pressure of the gaseous fuel in the first gaseous fuel tank arrangement 105 is below the current demanded injection pressure or the predetermined first threshold value. Hereby, the utilization of the compressor 150 is improved. The pre-defined pressure above the current demanded injection pressure may at least correspond to the expected pressure losses from the buffer tank 170 to the clean combustion engine 10.

The control unit 17 may be further configured to control supply of pressurized gaseous fuel from the first gaseous fuel tank arrangement 105 and the second gaseous fuel tank arrangement 110 to the clean combustion engine 10 using the fourth and second supply lines 126, 122, and to control the compressor 150 such that the gaseous fuel in the second supply line 122 is raised to the maximum required injection pressure, in response to that the pressure of the gaseous fuel in the second gaseous fuel tank arrangement 110 is below the predetermined maximum required injection pressure. This may e.g. be achieved by that the control unit 17 operates the controllable valves 180, 182, 184, 186, 188 such that the first, third and fifth controllable valves 180, 184, 188 are open, and the second and fourth controllable valves 182, 186 are closed. For example, when the gaseous fuel in the first gaseous fuel tank arrangement 105 has been depleted, the gaseous fuel in the second gaseous fuel tank arrangement 110 may be supplied to the second supply line 122 and the compressor 150 for subsequent supply of pressurized gaseous fuel to the clean combustion engine 10. Alternatively, by closing the third controllable valve 184, and opening the second controllable valve 182, the pressurized gaseous fuel from the second gaseous fuel tank arrangement 110 may be controlled to the clean combustion engine 10 using the first supply line 120.

The gaseous fuel supply system may additionally comprise one or more heat exchangers. In the example of FIG. 2, a first heat exchanger 160 is arranged downstream of the compressor 150, and upstream of the buffer tank 170, in order to heat the pressurized gaseous fuel prior to reaching the buffer tank 170. However, a heat exchanger may alternatively, or additionally be arranged upstream of the compressor 150.

Figure 3:
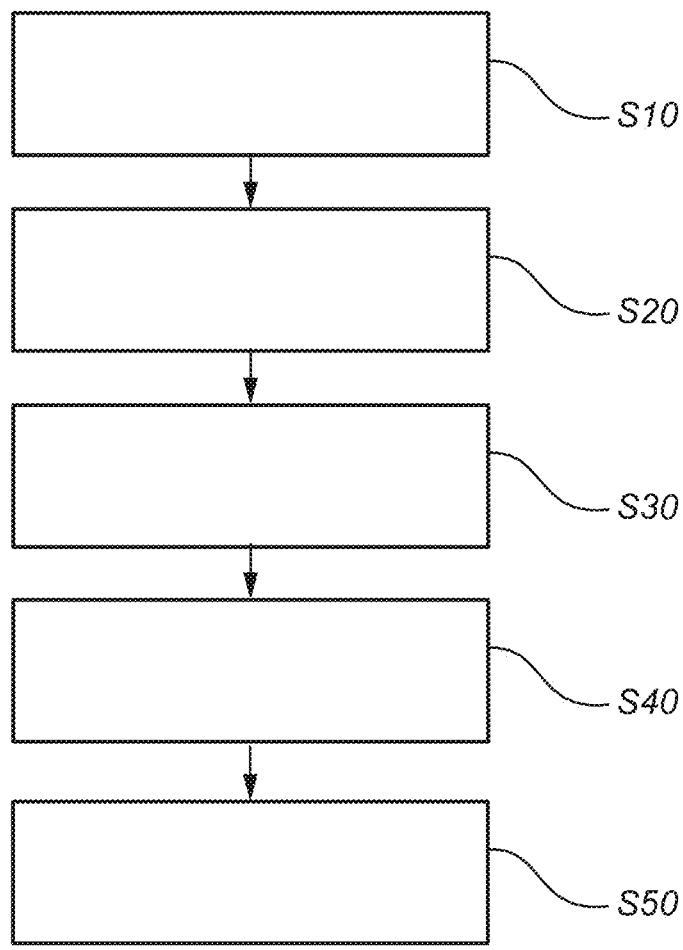
FIG. 3 is a flowchart is a flow chart of an exemplary method according to one example.

FIG. 3 is a flow chart of a method for controlling a gaseous fuel supply system for a clean combustion engine being configured to receive gaseous fuel at a changeable demanded injection pressure being above a predetermined minimum required injection pressure and below a predetermined maximum required injection pressure, such as e.g. the gaseous fuel supply system 100 and the clean combustion 10 of FIG. 2. Thus, reference is further made to features described in FIGS. 1-2 in the following.

In a first action or step, S10, pressurized gaseous fuel is supplied from a first gaseous fuel tank arrangement 105 comprising at least a first gaseous fuel tank 105*s*, 105*b* to the clean combustion engine 10 using a first supply line 120 in response to that the pressure of the gaseous fuel in the first gaseous fuel tank arrangement 105 is above the predetermined maximum required injection pressure. This may e.g. be achieved by the control unit 17 controlling the controllable valves 180, 182, 184, 186, 188 as previously described.

In a second action or step, S20, e.g. occurring subsequently to the first action or step S10, pressurized gaseous fuel is supplied from the first gaseous fuel tank arrangement 105 to the clean combustion engine 10 using a second supply line 122, the second supply line 122 comprising a compressor 150 and a gaseous fuel buffer tank 170 arranged downstream of the compressor 150, at least the compressor 150 being arranged to bypass the first supply line 120, and is pressurized by the compressor 150, such that the pressurized gaseous fuel in the buffer tank 170 at least reaches the current demanded injection pressure, in response to that the pressure of the gaseous fuel in the first gaseous fuel tank arrangement 105 is below the current demanded injection pressure or a predetermined first threshold value. This may e.g. be achieved by the control unit 17 controlling the controllable valves 180, 182, 184, 186, 188 as previously described.

In a third action or step, S30, e.g. occurring subsequently (but potentially at least partly simultaneously) to the second action or step S20, pressurized gaseous fuel from the second gaseous fuel tank arrangement 110 is supplied to the buffer tank 170 using a third supply line 124 in response to a sudden increase in the demanded injection pressure. This may e.g. be achieved by the control unit 17 controlling the controllable valves 180, 182, 184, 186, 188 as previously described.

In an optional fourth action or step, S40, pressurized gaseous fuel is supplied from the first gaseous fuel tank arrangement 105 to the clean combustion engine 10 using the first supply line 120 in response to that the pressure of the gaseous fuel in the first gaseous fuel tank arrangement 105 is above the current demanded injection pressure or a predetermined second threshold vale, and below the predetermined maximum required injection pressure. This may e.g. be achieved by the control unit 17 controlling the controllable valves 180, 182, 184, 186, 188 as previously described.

In an optional fifth action or step, S50, the gaseous fuel is pressurized, using the compressor 150, such that the gaseous fuel in the buffer tank 170 reaches the current demanded injection pressure, or at most a pre-defined pressure above the current demanded injection pressure, in response to that the pressure of the gaseous fuel in the first gaseous fuel tank arrangement 105 is below the current demanded injection pressure or a predetermined first threshold value.

Example 1. A gaseous fuel supply system for a clean combustion engine configured to receive gaseous fuel at a changeable demanded injection pressure being above a predetermined minimum required injection pressure and below a predetermined maximum required injection pressure, the supply system comprising: a first gaseous fuel tank arrangement comprising at least a first gaseous fuel tank, and a second gaseous fuel tank arrangement comprising at least a second gaseous fuel tank, the first and second gaseous fuel tank arrangements storing pressurized gaseous fuel; a first supply line arranged to supply pressurized gaseous fuel from the first gaseous fuel tank arrangement to the clean combustion engine; a second supply line arranged to supply pressurized gaseous fuel from the first gaseous fuel tank arrangement to the clean combustion engine, the second supply line comprising a compressor and a gaseous fuel buffer tank arranged downstream of the compressor, at least the compressor being arranged to bypass the first supply line; a third supply line arranged to supply pressurized gaseous fuel from the second gaseous fuel tank arrangement to the buffer tank, the third supply line being different to the first and second supply lines; and a control unit configured to: control supply of pressurized gaseous fuel from the first gaseous fuel tank arrangement to the clean combustion engine using the first supply line in response to that the pressure of the gaseous fuel in the first gaseous fuel tank arrangement is above the predetermined maximum required injection pressure; and control supply of pressurized gaseous fuel from the first gaseous fuel tank arrangement to the clean combustion engine using the second supply line, and control the compressor such that the gaseous fuel in the buffer tank is pressurized to at least the current demanded injection pressure, in response to that the pressure of the gaseous fuel in the first gaseous fuel tank arrangement is below the current demanded injection pressure or a predetermined first threshold value; and subsequently, in response to a sudden increase in the demanded injection pressure, control supply of pressurized gaseous fuel from the second gaseous fuel tank arrangement to the buffer tank using the third supply line.

Example 2. The gaseous fuel supply system of example 1, wherein the first supply line and the third supply line do not overlap with each other.

Example 3. The gaseous fuel supply system of any of examples 1-2, wherein the control unit is configured to control supply of pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold value, and below the predetermined maximum required injection pressure.

Example 4. The gaseous fuel supply system of any of examples 1-3, wherein the control unit is configured to control the compressor such that the gaseous fuel in the buffer tank is pressurized to the current demanded injection pressure, or at most a pre-defined pressure above the current demanded injection pressure, in response to that the pressure of the gaseous fuel in the first gaseous fuel tank arrangement is below the current demanded injection pressure or the predetermined first threshold value.

Example 5. The gaseous fuel supply system of any of examples 1-4, further comprising: a fourth supply line arranged to supply pressurized gaseous fuel from the second gaseous fuel tank arrangement to the second supply line, wherein the control unit is configured to control supply of pressurized gaseous fuel from the first gaseous fuel tank arrangement and the second gaseous fuel tank arrangement to the clean combustion engine using the fourth and second supply lines, and to control the compressor such that the gaseous fuel in the second supply line is raised to the maximum required injection pressure, in response to that the pressure of the gaseous fuel in the second gaseous fuel tank arrangement is below the predetermined maximum required injection pressure.

Example 6. The gaseous fuel supply system of example 5, wherein the fourth supply line is further arranged to supply pressurized gaseous fuel from the second gaseous fuel tank arrangement to the first supply line.

Example 7. The gaseous fuel supply system of any of examples 1-6, wherein the first gaseous fuel tank arrangement comprises a plurality of first gaseous fuel tanks, and/or wherein the second gaseous fuel tank arrangement comprises a plurality of second gaseous fuel tanks.

Example 8. The gaseous fuel supply system of any of examples 1-7, further comprising a plurality of valves arranged in at least the first, second and third supply lines, wherein the control unit is configured to control the valves to control the flow of pressurized gaseous fuel in the first, second and third supply lines.

Example 9. The gaseous fuel supply system of any of examples 1-8, wherein the first and second supply lines at least partly overlap.

Example 10. The gaseous fuel supply system of any of examples 1-9, wherein the first, second and third supply lines are comprised in piping of the gaseous fuel supply system.

Example 11. The gaseous fuel supply system of any of examples 1-10, wherein the buffer tank is configured to supply pressurized gaseous fuel to the clean combustion engine via the second supply line.

Example 12. The gaseous fuel supply system of any of examples 1-11, further comprising a heat exchanger arranged upstream or downstream of the compressor.

Example 13. The gaseous fuel supply system of any of examples 1-12, wherein the control unit is configured to, in response to that the pressure of the gaseous fuel in the second gaseous fuel tank arrangement is below the predetermined maximum required injection pressure but above the pressure of the gaseous fuel in the buffer tank, control supply of pressurized gaseous fuel from the second gaseous fuel tank arrangement to the buffer tank.

Example 14. The gaseous fuel supply system of any of examples 1-13, wherein the pressurized gaseous fuel is pressurized hydrogen.

Example 15. A vehicle comprising the gaseous fuel supply system according to any of examples 1-14.

Example 16. The vehicle of example 15, further comprising a clean combustion engine being a hydrogen combustion engine or a hydrogen high pressure direct injection engine.

Example 17. The vehicle of any of examples 15-16, wherein the minimum required injection pressure of the clean combustion engine is at least 80 bar.

Example 18. A method for controlling a gaseous fuel supply system for a clean combustion engine being configured to receive gaseous fuel at a changeable demanded injection pressure being above a predetermined minimum required injection pressure and below a predetermined maximum required injection pressure, the method comprising: supplying pressurized gaseous fuel from a first gaseous fuel tank arrangement comprising at least a first gaseous fuel tank to the clean combustion engine using a first supply line in response to that the pressure of the gaseous fuel in the first gaseous fuel tank arrangement is above the predetermined maximum required injection pressure; supplying pressurized gaseous fuel from the first gaseous fuel tank arrangement to the clean combustion engine using a second supply line, the second supply line comprising a compressor and a gaseous fuel buffer tank arranged downstream of the compressor, at least the compressor being arranged to bypass the first supply line, and pressurizing the gaseous fuel, by the compressor, such that the pressurized gaseous fuel in the buffer tank at least reaches the current demanded injection pressure, in response to that the pressure of the gaseous fuel in the first gaseous fuel tank arrangement is below the current demanded injection pressure or a predetermined first threshold value; and subsequently supplying, in response to a sudden increase in the demanded injection pressure, pressurized gaseous fuel from the second gaseous fuel tank arrangement to the buffer tank using a third supply line.

Example 19. The method of example 18, further comprising: supplying pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold vale, and below the predetermined maximum required injection pressure.

Example 20. The method of any of examples 18-19, further comprising:
pressurizing the gaseous fuel, using the compressor, such that the gaseous fuel in the buffer tank reaches the current demanded injection pressure, or at most a pre-defined pressure above the current demanded injection pressure, in response to that the pressure of the gaseous fuel in the first gaseous fuel tank arrangement is below the current demanded injection pressure or a predetermined first threshold value.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A gaseous fuel supply system for a clean combustion engine configured to receive gaseous fuel at a changeable demanded injection pressure being above a predetermined minimum required injection pressure and below a predetermined maximum required injection pressure, the supply system comprising:
a first gaseous fuel tank arrangement comprising at least a first gaseous fuel tank, and a second gaseous fuel tank arrangement comprising at least a second gaseous fuel tank, the first and second gaseous fuel tank arrangements storing pressurized gaseous fuel;

a first supply line arranged to supply pressurized gaseous fuel from the first gaseous fuel tank arrangement to the clean combustion engine;

a second supply line arranged to supply pressurized gaseous fuel from the first gaseous fuel tank arrangement to the clean combustion engine, the second supply line comprising a compressor and a gaseous fuel buffer tank arranged downstream of the compressor, at least the compressor being arranged to bypass the first supply line;

a third supply line arranged to supply pressurized gaseous fuel from the second gaseous fuel tank arrangement to the buffer tank, the third supply line being different to the first and second supply lines; and a control unit configured to:

control supply of pressurized gaseous fuel from the first gaseous fuel tank arrangement to the clean combustion engine using the first supply line in response to that the pressure of the gaseous fuel in the first gaseous fuel tank arrangement is above the predetermined maximum required injection pressure;

control supply of pressurized gaseous fuel from the first gaseous fuel tank arrangement to the clean combustion engine using the second supply line, and control the compressor such that the gaseous fuel in the buffer tank is pressurized to at least the current demanded injection pressure, in response to that the pressure of the gaseous fuel in the first gaseous fuel tank arrangement is below the current demanded injection pressure or a predetermined first threshold value; and subsequently, in response to a sudden increase in the demanded injection pressure, control supply of pressurized gaseous fuel from the second gaseous fuel tank arrangement to the buffer tank using the third supply line.

2. The gaseous fuel supply system of claim 1, wherein the first supply line and the third supply line do not overlap with each other.

3. The gaseous fuel supply system of claim 1, wherein the control unit is configured to control supply of pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold value, and below the predetermined maximum required injection pressure.

4. The gaseous fuel supply system of claim 1, wherein the control unit is configured to control the compressor such that the gaseous fuel in the buffer tank is pressurized to the current demanded injection pressure, or at most a predefined pressure above the current demanded injection pressure, in response to that the pressure of the gaseous fuel in the first gaseous fuel tank arrangement is below the current demanded injection pressure or the predetermined first threshold value.

5. The gaseous fuel supply system of claim 1, further comprising:

a fourth supply line arranged to supply pressurized gaseous fuel from the second gaseous fuel tank arrangement to the second supply line, wherein the control unit is configured to control supply of pressurized gaseous fuel from the first gaseous fuel tank arrangement and the second gaseous fuel tank arrangement to the clean combustion engine using the fourth and second supply lines, and to control the compressor such that the gaseous fuel in the second supply line is raised to the maximum required injection pressure, in response to that the pressure of the gaseous fuel in the second gaseous fuel tank arrangement is below the predetermined maximum required injection pressure.

6. The gaseous fuel supply system of claim 5, wherein the fourth supply line is further arranged to supply pressurized gaseous fuel from the second gaseous fuel tank arrangement to the first supply line.

7. The gaseous fuel supply system of claim 1, wherein the first gaseous fuel tank arrangement comprises a plurality of first gaseous fuel tanks, and wherein the second gaseous fuel tank arrangement comprises a plurality of second gaseous fuel tanks.

8. The gaseous fuel supply system of claim 1, further comprising a plurality of valves arranged in at least the first, second and third supply lines, wherein the control unit is configured to control the valves to control the flow of pressurized gaseous fuel in the first, second and third supply lines.

9. The gaseous fuel supply system of claim 1, wherein the first and second supply lines at least partly overlap.

10. The gaseous fuel supply system of claim 1, wherein the first, second, and third supply lines are comprised in piping of the gaseous fuel supply system.

11. The gaseous fuel supply system of claim 1, wherein the buffer tank is configured to supply pressurized gaseous fuel to the clean combustion engine via the second supply line.

12. The gaseous fuel supply system of claim 1, further comprising a heat exchanger arranged upstream or downstream of the compressor.

13. The gaseous fuel supply system of claim 1, wherein the control unit is configured to, in response to that the pressure of the gaseous fuel in the second gaseous fuel tank arrangement is below the predetermined maximum required injection pressure but above the pressure of the gaseous fuel in the buffer tank, control supply of pressurized gaseous fuel from the second gaseous fuel tank arrangement to the buffer tank.

14. The gaseous fuel supply system of claim 1, wherein the pressurized gaseous fuel is pressurized hydrogen.

15. A vehicle comprising the gaseous fuel supply system of claim 1.

16. The vehicle of claim 15, further comprising the clean combustion engine being a hydrogen combustion engine or a hydrogen high pressure direct injection engine.

17. The vehicle of claim 15, wherein the minimum required injection pressure of the clean combustion engine is at least 80 bar.

18. A method for controlling a gaseous fuel supply system for a clean combustion engine being configured to receive gaseous fuel at a changeable demanded injection pressure being above a predetermined minimum required injection pressure and below a predetermined maximum required injection pressure, the method comprising:

supplying pressurized gaseous fuel from a first gaseous fuel tank arrangement comprising at least a first gaseous fuel tank to the clean combustion engine using a first supply line in response to that the pressure of the gaseous fuel in the first gaseous fuel tank arrangement is above the predetermined maximum required injection pressure;

supplying pressurized gaseous fuel from the first gaseous fuel tank arrangement to the clean combustion engine using a second supply line, the second supply line comprising a compressor and a gaseous fuel buffer tank arranged downstream of the compressor, at least the compressor being arranged to bypass the first supply line, and pressurizing the gaseous fuel, by the compressor, such that the pressurized gaseous fuel in the buffer tank at least reaches the current demanded injection pressure, in response to that the pressure of the gaseous fuel in the first gaseous fuel tank arrangement is below the current demanded injection pressure or a predetermined first threshold value; and subsequently supplying, in response to a sudden increase in the demanded injection pressure, pressurized gaseous fuel from the second gaseous fuel tank arrangement to the buffer tank using a third supply line.

19. The method of claim 18, further comprising:

supplying pressurized gaseous fuel from the first gaseous fuel tank arrangement to the clean combustion engine using the first supply line in response to that the pressure of the gaseous fuel in the first gaseous fuel tank arrangement is above the current demanded injection pressure or a predetermined second threshold vale, and below the predetermined maximum required injection pressure.

20. The method of claim 18, further comprising:

pressurizing the gaseous fuel, using the compressor, such that the gaseous fuel in the buffer tank reaches the current demanded injection pressure, or at most a pre-defined pressure above the current demanded injection pressure, in response to that the pressure of the gaseous fuel in the first gaseous fuel tank arrangement is below the current demanded injection pressure or a predetermined first threshold value.

\* \* \* \* \*